United States Patent [19]

Le Beon

[11] Patent Number: 4,554,712
[45] Date of Patent: Nov. 26, 1985

[54] SAFETY HOOKS

[76] Inventor: Roger M. Le Beon, 7, Bd Louis Nail BP 138, 56103 Lorient Cedex, France

[21] Appl. No.: 604,647
[22] PCT Filed: Aug. 8, 1983
[86] PCT No.: PCT/FR83/00166
§ 371 Date: Apr. 4, 1984
§ 102(e) Date: Apr. 4, 1984
[87] PCT Pub. No.: WO84/00744
PCT Pub. Date: Mar. 1, 1984

[30] Foreign Application Priority Data

Aug. 6, 1982 [FR] France ............... 82 14027

[51] Int. Cl.⁴ ................................. A44B 13/00
[52] U.S. Cl. .................. 24/241 PP; 24/241 P; 24/241 PL; 24/232 R
[58] Field of Search .......... 24/241 R, 241 P, 241 PP, 24/241 PL, 241 PS, 241 SP, 241 SB, 241 S, 232 R; 294/82

[56] References Cited

U.S. PATENT DOCUMENTS

| 453,877 | 6/1891 | Bonfoey | 24/232 R |
| 701,586 | 6/1902 | Levitt | 24/241 SP |
| 1,088,614 | 2/1914 | Olstad | 24/241 PS |
| 1,291,673 | 1/1919 | Robinson | 24/241 PS |
| 1,373,235 | 3/1921 | Giberson | 24/232 R |
| 1,390,023 | 9/1921 | Coon . | |
| 1,411,857 | 4/1922 | Maiden . | |
| 1,441,378 | 1/1923 | Selvidge | 24/241 PL |
| 1,465,804 | 8/1923 | Bubb | 24/241 P |
| 1,688,176 | 10/1928 | Clark | 24/241 P |
| 1,716,997 | 6/1929 | Antoniow | 24/241 P |
| 1,725,609 | 8/1929 | Amos . | |
| 4,118,840 | 10/1978 | Fengels | 24/232 R |

FOREIGN PATENT DOCUMENTS

| 946394 | 6/1949 | France . |
| 1574978 | 7/1969 | France . |
| 200029 | 7/1923 | United Kingdom . |
| 550162 | 12/1942 | United Kingdom . |
| 0002396 | 6/1979 | United Kingdom . |

Primary Examiner—Victor N. Sakran
Attorney, Agent, or Firm—Roland Plottel

[57] ABSTRACT

It particularly concerns improvements on safety hooks doted with an articulated arm (1) on to the body of the hook (2) on its top part and opening externally from the hook and doted with a fastening device of the free end of the body of the hook by the free end of the arm and characterized by one flat contact face (f, f') on each of the two parts, one receiving a cylinder shaped prominence (c), and the other one receiving a cylinder-shaped hole (t) so as to obtain the penetration of the prominence in the hole when shutting the hook thus avoiding any bending out of shape of the body of the hook when the load is too important.

The invention applies to hooks for lifting particularly.

8 Claims, 3 Drawing Figures

SAFETY HOOKS

Figure 1:
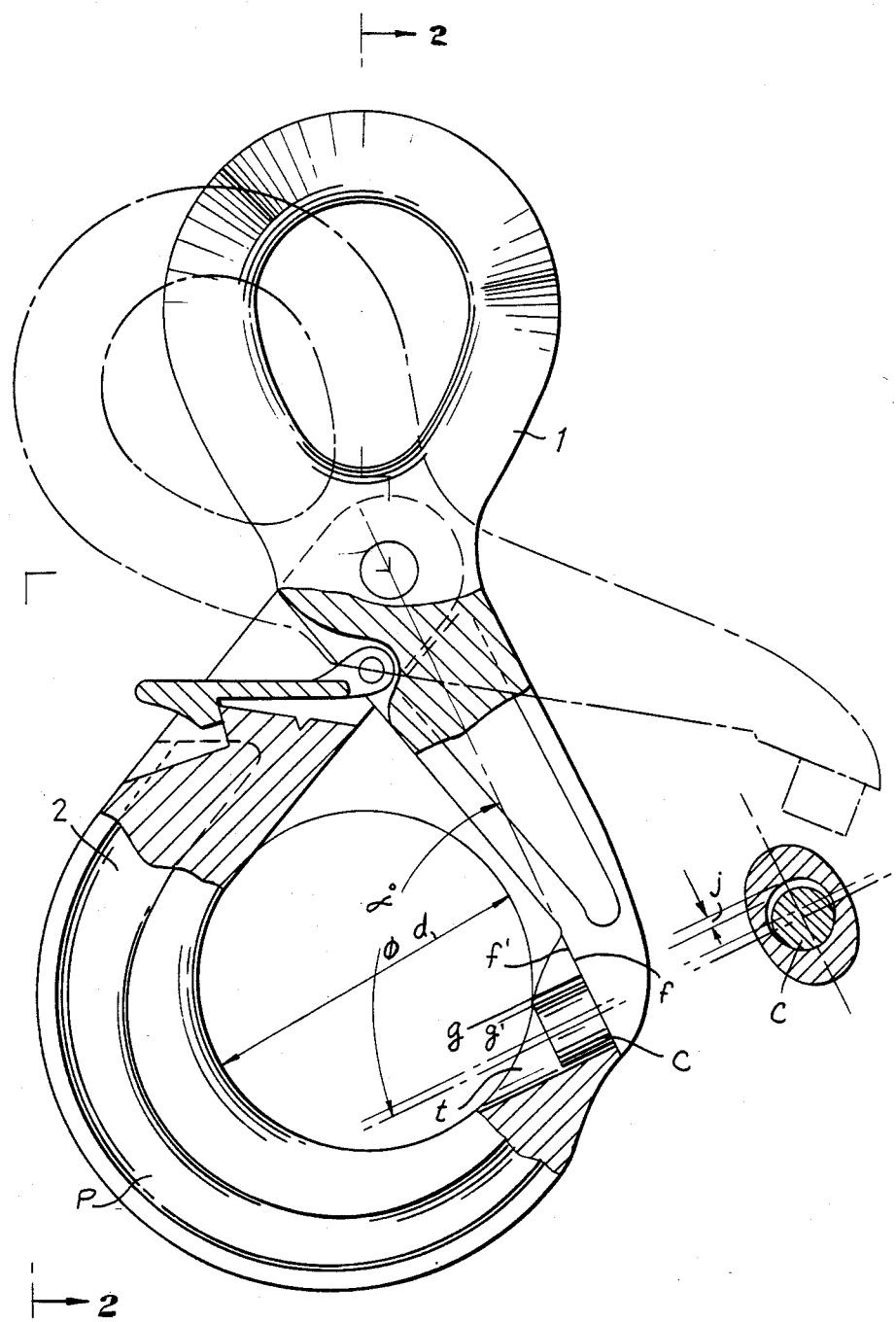
Figure 2:
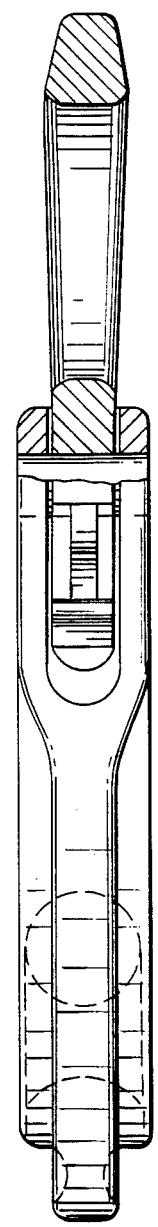
Figure 3:
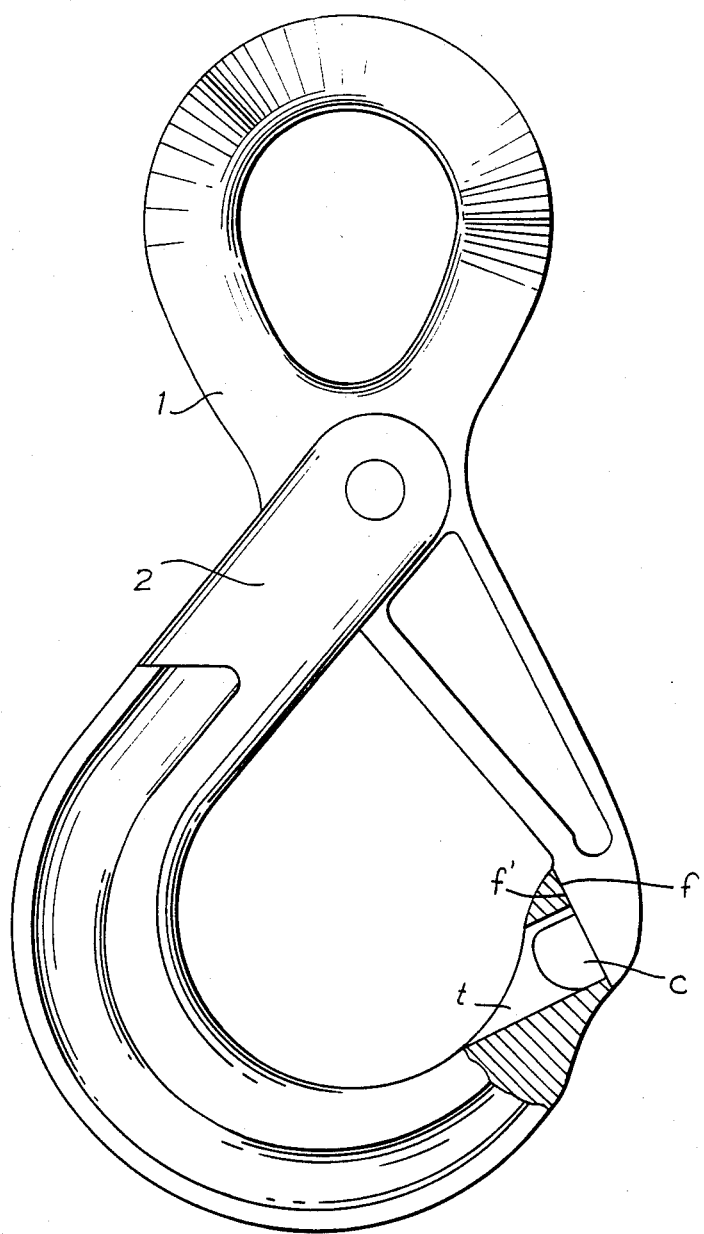

This invention concerns safety hooks, and more peculiarly those that are doted with an articulated arm on to the body of the hook in its top part and opening externally from the hook according to FIG. 1.

The safety hook is held by the top part of the arm. When under tension, the hook is shut automatically, the free end of the arm coming into contact with the end of the hook and preventing the load from being unhooked accidentally.

This type of hook is used more and more, and especially in handling operations that offer the greater risks: i.e. Construction and building yards. This type of hook is simple, efficient and safe.

However, the most popular hooks that are now used have some drawbacks: the body of the hook supports the total load given to it and often more: In fact, when under tension, the free end of the arm is pressing on the end of the hook thus creating an extra downwards effort that is all the more important since the load is heavier (see drawing).

This effort is added to that of the load and make the kook bend out of shape when loaded. This requires, for an equal load, an overdimensioning of the working part (P) of the body of the hook, which is also the one where the constraints in the material are up to a maximum.

Such an overdimensioning of the hook leads to an increased weight making the hooks in the bigger calibers, heavy, bulky, and dangerous to handle.

One has tried to improve on these drawbacks for a long time.

The today's known improvement consists in a special shaping of the ends of the hook and of the arm so as to get the arm and the hook bound with each other when the device is shut.

Thus, the arm directly contributes in supporting part of the load and holds back the end of the body of the hook, prevents it from bending out of shape, and allows the lightening of the body of the hook.

See U.S. Pat. No. 1,449,364 to Gowan, or by new fastening devices under the same principle: cross-shaped hooking: U.S. Pat. No. 1,430,824 to Martin, or by a cone shaped end of the body of the hook coming into the hole of the end of the arm and combined with a locking system: U.S. Pat. No. 1,465,804, Bubb, or hook-shaped end of the body, and handle-shaped arm.

U.S. Pat. No. 2,476,847 to Dobson
U.S. Pat. No. 2,462,965 to Henderson
U.S. Pat. No. 2,436,792 to Dahlander
U.S. Pat. No. 2,359,557 to Hoffman More recently, the improvements have been made essentially on the locking devices of the hooks, though still complying with the same fastening devices of the ends of the arm and of the body of the hook—U.S. Pat. No. 3,785,015 to Dorton.

The patents or projects for safety hooks offering a fastening device of the arm and the hook are quite many. In spite of that none of them has now been or is now largely spread most of them have been industrial or commercial failures.

Actually, they have disavantages: the shapes of the ends of the arm and of the hook used to fasten them are far too complex.

When put in an industrial process, they are difficult to realize and thus too costly.

Moreover, the principle used for these hooks is such that as soon as the hook is shut both ends come into contact which creates important constraints on the fastening device, when loaded. The fastening device is then opposed to the total load which consequently leads to increase the weight of the hook.

The advantage offered by these hooks is then far from being obvious, and it explains why they have not yet completely replaced the traditional hooks.

The goal of the present invention is to find a solution to the disadvantages of these hooks. It aims to a better distribution of the constraints in the components of the hooks, to lower the weight of the hooks and to allow a less costly industrial fabrication, whilst ensuring an increased safety.

So the invention applies to safety hooks that are equiped with articulated arms on the top parts of the bodies, opening externally from the hook and doted with a fastening device of the free end of the arm, so that when loaded, the body of the hook could not bend out of shape prematurely. This fastening device is characterized by the contact of two flat faces composed as follows: one showing a perpendicular cylinder-shaped prominence perpendicular, and the other are showing a perpendicular cylinder-shaped hole the dimensions of which are bigger than those of the prominence and drilled to accept the prominence when shutting the hook. Contrarily, the prominence could be on the body and the hole on the arm.

In order to avoid any release of the prominence and the hole when the hook is loaded, this fastening device is specially oriented so as to obtain an angle inferior to 90%, the vertex of which is the point given by the intersection either of the axis of the cylinder, or of that of the hole, or one of the contact generating parts of the cylinder and the hole with the contact faces of the ends of the arm and body of the hook, and the sides of which are: on one hand, either one of the so-called axis and generating part, and on the other hand, a straight line joining the vertex to the articulation axis of the arm and of the body of the hook, and opening to the inside space given between the arm and the body of the hook.

So as to get a good working of the fastening device, a good opening and shutting of the hook, this angle must be between 80° and 90°.

To ensure a good distribution of the constraints between the body of the hook and the arm, there is a loose setting of the fastening device between the contact generating parts of the prominence and of the hole when the hook is shut unloaded.

This loose setting is far more important than normally necessary to a good mechanical working of the safety hook. When the hook is moderately loaded according to its given safe working load and breakload, the body of the hook only supports the load. There is no contact between the prominence and the hole of the fastening device.

When the hook is submitted to an important load, the body bending a little out of shape, is going to have an elastic flexing making the loose setting disappear between the prominence and the hole that are then coming into contact, the flat faces of the arm and of the body of the hook are sliding on to the each other. The overloading is therefore supported by the arm by means of the fastening device. Then, whatever the load can be, the body will not bend out of shape any more. This principle allows a limitation of the constraints in the body of the hook thus allowing a lightening of it compared to a safety hook without any fastening device, and to let the arm support the otherloads only thus allowing a lightening of the arm compared to those of the hooks offering already known fastening devices.

To obtain a good working of the fastening device as described in the above, the loose setting between the prominence and the hole must be dimensioned between 0.02 and 0.04 times the diameter of the circle inseribable in the interior space defined by the arm and the body of the hook.

By doing so, it is possible to obtain a hook that is 50% less heavy than a standard hook without a fastening device.

According to the invention, this considerable lightening gives the designed hooks a great advantage as far as their handling is concerned thanks to the facility and safety given by the handling of lighter hooks.

Besides, in compliance with the invention, this fastening device offers the advantage of allowing a very economical industrial fabrication by drop forging both the arm and the body of the hook and by simply drilling the hole.

According to an alternative of the invention, the cylinder-shaped hole could be given a slightly flattened shape by means of a mechanical pressing of the end of the body of the hook or of the arm, and this at a very low cost during an industrial process. The prominence would then have the same shape.

So as to avoid all risks of obstruction of the hole by anything, i.e. sand of pebbles in the case of the use of the hook on building yards, the cylinder-shaped hole is drilled right through.

Thus, any element obstructing the hole will be punched out by the prominence when shutting the hook and will not interfere in its good working which would not be the case if the whole were not drilled right through or were having a conical shape.

So we can easily see that the safety hook designed in compliance with the invention operates fundamentally differently from the existing hooks and offers the fundamental advantage of being much less heavy and much easier to handle and much less dangerous.

According to a given preferential shape of realization from drawings 1, 2 and 3, the described safety hook is composed of one articulated arm (1) on to the body of the hook (2).

Both the free ends of the arm and of the body of the hook have a flat contact face (f, f') through the articulation axis of the arm and of the body of the hook.

The flat face of the end of the arm has a cylinder-shape prominence the axis of which is perpendicular to the flat face. The flat face of the end of the body of the hook has a cylinder-shaped hole drilled right through and the diameter of which is slightly superior to that of the prominence and the axis of which is perpendicular to the flat face. When shutting the hook unloaded, both flat faces come into contact and the prominence comes into the hole allowing a loose setting that is reduced to a minimum in its lower part and more important (j) between the contact generating parts (g, g') of the prominence and of the hole of about 0.025 times the diameter (d). When the hook is moderately loaded, the body of the hook is given a moderate flexing which is not sufficient to cause the coming into contact of the generating parts (g) and (g'). The body of the hook then holds the total load by itself.

When the hook is given a more important load, the body of the hook then has, under the effect of this load, an important flexing which relatively causes a sliding of the flat faces of the arm and of the body of the hook. Then the contact of the generating parts (g) and (g') of the prominence and of the hole eliminates the loose setting (j).

At this point, the hook does not bend out of shape any more, and therefore does not have any extra important constraint.

The effort is supported by the arm through the prominence.

Thus under an important load, the constraints engendered between the body of the hook and the arm are distributed, and this is what allows the design of a light, easy to handle, less dangerous hook than the standard hooks.

The above described hook, also offers the advantage of a possible industrial realization, simple and cheap, by drop forging the arm and the body of the hook, the cylinder shaped hole being obtained by drilling.

It is then easy to understand the determinant advantages compared to the standard hooks, and more specifically the weight, the facility, and the safety as far as handling is concerned. Moreover it also offers simplicity and a low industrial cost.

The invention applies to all safety hooks doted with an articulated arm on the body of the hook in its top part and opening externally from the hook, and more especially the mass-produced ones made for all the industries, building, civil engineering, agriculture, and more generally all activities requiring the lifting and handling of loads.

I claim:

1. A safety hook having a hook body (2) with an articulated arm (1) on said hook body top part, and opening externally from the hook and also having a fastening device of the free end of the hook body where it forms a free end of the arm, said fastening device having a flat contact face (f, f') on each part of the arm and body, one of the flat faces having a cylinder-shaped prominence (c) the axis of which is perpendicular thereto; and the other of the faces having a cylinder-shaped hole (t) the axis of which is perpendicular thereto and the dimensions of which are greater than those of the prominence and situated such as to accept the prominence into it when the hook is shut, thus constituting a fastening device of the body of the hook by the arm and preventing the body from any premature bending of the hook by the arm and preventing the body from any premature bending out of shape; and said fastening device further comprising for operation when the hook is not loaded, a loose setting (j) of the fastening device between contact generating parts (g) and (g') of the prominence and of the hold and larger than the normal loose setting required for a good mechanical working of the safety hook and allowing the body of the hook to support by itself the load for which it has been designed without creating any contact between the prominence and the hole of the fastening device; or allowing the arm to support the overloads due to the coming into contact of the prominence and the hold after elimination of the loose setting by means of the elastic flexing of the body of the hook, thereby obtaining a good working of the fastening device with the loose setting being situated between 0.02 and 0.04 times the diameter of the circle inscribable (d) in the interior space defined by the arm and the body of the hook.

2. Safety hook with a fastening device according to claim 1 and characterized by an angle ($\alpha$) the vertex of which is the point given by the intersection either of the axis of the prominence, on that of the hole with the contact plane of the ends of the arm and of the body of the hook, and the sides of which are on one hand either one of the so-called axis and on the other hand, a straight line joining the vertex to the articulation axis of the arm and of the body of the hook, this angle opening towards the inside of the space left between the arm and the body of the hook, and the value of which is between 80° and 90° thus ensuring the good working of the fastening device and a good opening and shutting of the hook.

3. Safety hook with a fastening device in accordance with claim 1 characterized by the obtention of the cylinder-shaped hole by drilling, a very economical process.

4. Safety hook with a fastening device in accordance with claim 1 characterized by a flattened cylinder shape of the hole of the fastening device.

5. Safety hook with a fastening device, in accordance with claim 1 characterized by a flattened cylinder shape of the prominence of the fastening device.

6. Safety hook with a fastening device in accordance with claim 5, charactericed by the drilling right through of the cylinder-shaped hole so as to allow the punching out of any obstructing element stuck in the hole.

7. A safety hook with a fastening device according to claim 6, comprising said cylinder shaped hole extending and completely through said body so as to facilitate removal of any obstruction stuck in said hole.

8. A safety hook with a fastening device according to claim 1, comprising said cylinder shaped hole extending and completely through said body so as to facilitate removal of any obstruction stuck in said hole.

* * * * *